United States Patent [19]

Egner-Walter

[11] Patent Number: 5,495,637
[45] Date of Patent: Mar. 5, 1996

[54] WINDSHIELD WIPER SYSTEM OF A MOTOR VEHICLE INCLUDING A WIPER ARM

[75] Inventor: Bruno Egner-Walter, Heilbronn, Germany

[73] Assignee: SWF Auto-Electric GmbH, Germany

[21] Appl. No.: 390,271

[22] Filed: Feb. 16, 1995

Related U.S. Application Data

[63] Continuation of Ser. No. 857,919, Jan. 4, 1993, abandoned.

[30] Foreign Application Priority Data

Sep. 15, 1990 [DE] Germany .......................... 40 29 342.4

[51] Int. Cl.$^6$ ................................ B60S 1/32; B60S 1/04
[52] U.S. Cl. ................................. 15/250.351; 15/250.001; 15/250.16; 296/94.1; 296/96.15; 296/192
[58] Field of Search ........................... 15/250.35, 250.32, 15/250.42, 250.16, 250.19, 250.001, 250.002, 250.30; 296/84.1, 96.15, 192

[56] References Cited

U.S. PATENT DOCUMENTS

| 2,890,472 | 6/1959 | Olson | 15/250.35 |
| 3,016,558 | 1/1962 | Deibel | 15/250.16 |
| 3,213,478 | 10/1965 | Pollock | 15/250.19 |
| 3,525,114 | 8/1970 | Smith | 15/250.19 |
| 3,738,252 | 6/1973 | Cardinale | 15/250.16 |
| 3,832,751 | 9/1974 | Ursel | 15/250.35 |
| 4,765,019 | 8/1988 | Ochino | 15/250.16 |

FOREIGN PATENT DOCUMENTS

| 0013970 | 8/1980 | European Pat. Off. . |
| 0368090 | 5/1990 | European Pat. Off. . |
| 0396087 | 11/1990 | European Pat. Off. . |
| 848577 | 9/1960 | United Kingdom ................. 15/250.35 |

OTHER PUBLICATIONS

An English translation of DE 3838287 which is the priority document for EP 0 368 090 A2.

Primary Examiner—Gary K. Graham
Attorney, Agent, or Firm—Dykema Gossett

[57] ABSTRACT

The description relates to a windshield wiper system of a motor vehicle including a wider arm with an articulated member and wiper rod. The articulated member and the wiper rod have a curvature along their length substantially parallel to the windshield surface adjacent a lower edge of the windshield and a rear edge of the hood, resulting in a minimized overall height and providing for a minimized gap between the rear edge of the hood and the windshield surface adjacent the lower edge.

3 Claims, 1 Drawing Sheet

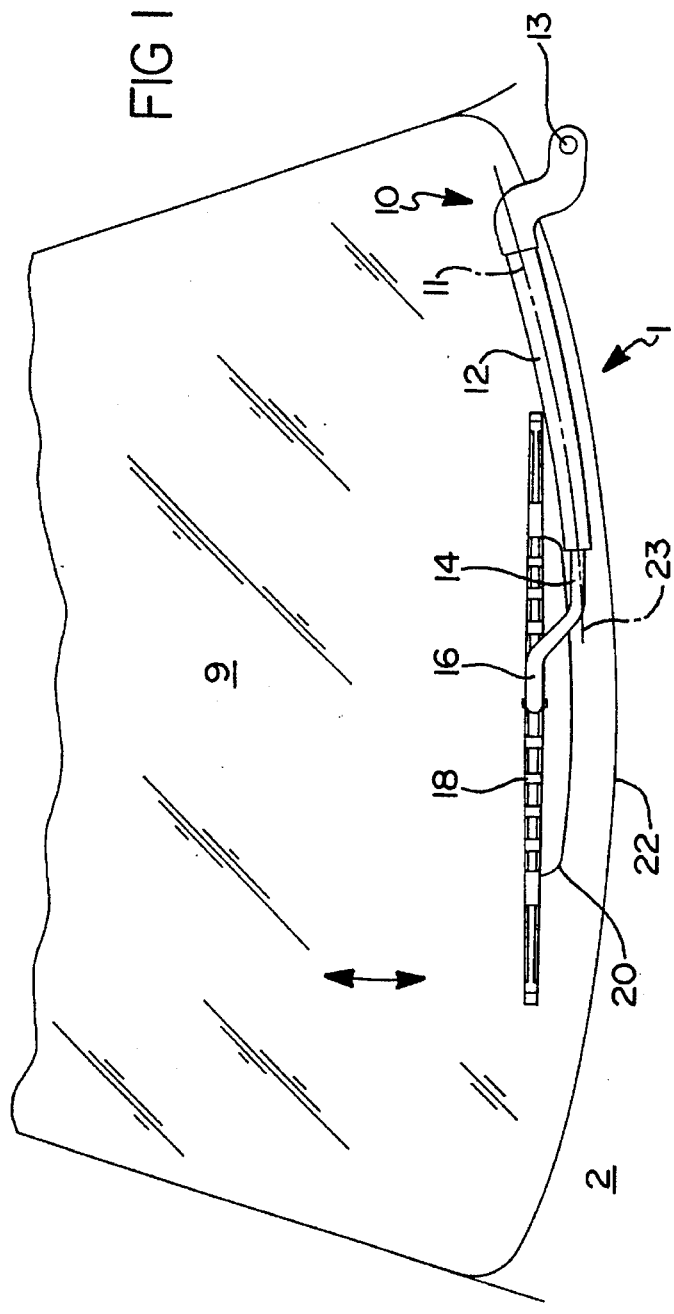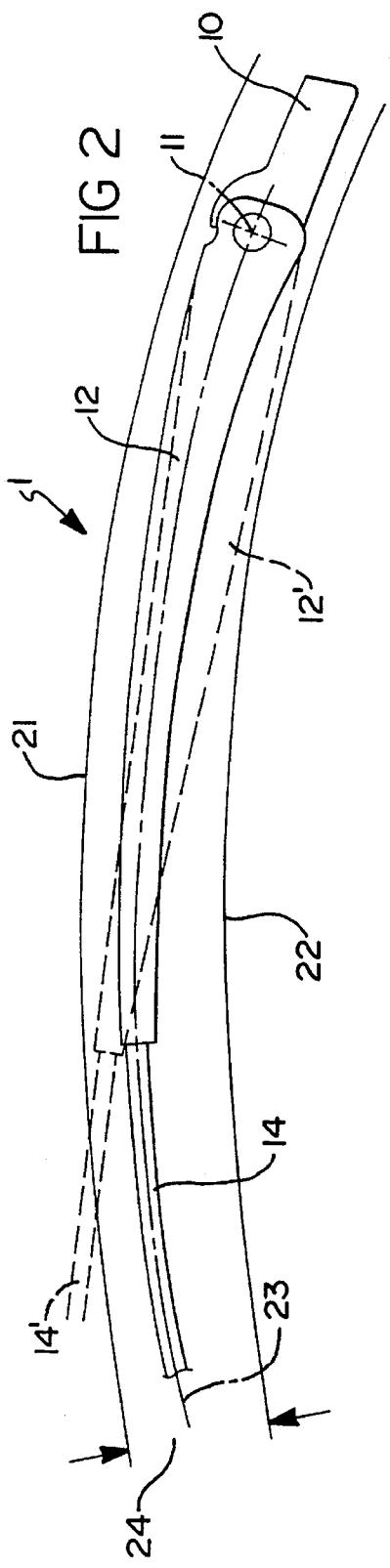

WINDSHIELD WIPER SYSTEM OF A MOTOR VEHICLE INCLUDING A WIPER ARM

This is a continuation of application(s) Ser. No. 07/857,919 filed on Jan. 4, 1993 now abandoned.

This invention relates to a wiper arm, particularly for windshield wiper systems of motor vehicles, with an articulated member and a wiper rod.

In conventional wiper arms as mentioned before the articulated member and the wiper rod are linear and aligned components, the portions of which are at different distances from the lower connecting area between the car body and the windshield. Thus the stylistic line of this part of the motor vehicle is negatively influenced. If, hereby, motor vehicles with a gap between the windshield and the hood, into which the wiper arm can be parked, are concerned, this gap must be wider than the interior height or the thickness of the wiper arm.

Taking the prior art mentioned above into consideration, the object of the invention is to remove this disadvantage and to develop the generic wiper arm in such a way that the stylistic line of the wiper arm can be improved and/or the height of the gap can be reduced.

This object is obtained according to the invention by giving the articulated member and/or the wiper rod an arc-shaped form and adapting them to the outer contour of the windshield and/or to the scuttle or the lower connecting area between the windshield and the car body of the motor vehicle.

Thus the wiper arm is characterized by the arc-shaped form of the articulated member and the wiper rod. Thus a particularly small overall height of the wiper arm can be obtained and in regard to conventional wiper arms it is possible to reduce the gap of the motor hood.

Further useful and advantageous embodiments of the invention can be taken from the subclaims.

A particularly useful embodiment of the invention provides that the side of the articulated member and of the wiper rod facing the windshield or the connecting area is adapted to the shape of the windshield or to the connecting area. Hereby it is useful, if the longitudinal median line of the wiper arm runs approximately parallelly to the connecting area. The main reason for these measures is to match the components connected to and/or cooperating with each other in such a way that an approximately uniform geometry of said components of the motor vehicle can be achieved.

If vehicles with a gap extending along the connecting area between the hood and the windshield are concerned, it is useful, if the side of the wiper arm facing the hood runs approximately parallelly to the hood. By this measure it is possible to minimize the height of the gap of the hood.

After all, in a wiper arm with a spoiler it is provided to form the side of the spoiler facing the connecting area as a continuation of the lower arc-shaped side of the articulated member.

The invention and advantageous embodiments thereof will be explained below by way of the embodiments illustrated in the drawing, in which FIG. 1 is a top view of a windshield, in the lower area of which a wiper arm is arranged, and FIG. 2 is the gap of a hood with a wiper arm arranged therein.

The wiper arm displayed in FIG. 1 is located in its start and repose position and is fixed onto a wiper shaft 13 underneath the connecting area 22 between the windshield 9 and the car body. The wiper arm can be pivoted around the axis of the wiper shaft 13 in the direction of the double arrow. The connecting area 22 is arc-shaped and extends in the direction of the wiper arm. The wiper arm 1 has an articulated member 12, the one end of which carries the wiper rod 14 with a wiper blade 18, whereas the other end is connected with a fastening member 10. The end portion 16 of the wiper rod 14 facing the wiper blade is crimped, so that the wiper blade 18 is dislocated towards the top with reference to the longitudinal median line of the wiper rod 14. A spoiler 20 is arranged at the side of the wiper blade 18 facing the connecting area 22, the side of which spoiler 20 facing the connecting area 22 runs approximately parallelly to the connecting area 22. It can be further seen from FIG. 1 that at least the articulated member 12 is arc-shaped and is adapted to the outer contour of the windshield 9 and to the lower connecting area 22. Thus the characteristic feature of the wiper arm 1 is the arc-shaped form of the articulated member 12. The fastening member 10 which can be pivoted around the axis is from its top view about Z-shaped and flexibly linked to the articulated member 12 by way of a swivelling peg 11 so that the articulated member 12 including wiper rod 14 of the wiper arm can also be pivoted in a plane extending approximately perpendicularly to the windshield. The fastening member 10 can detachably be linked with the wiper shaft 13 by way of a screw not illustrated any further.

FIG. 2 shows the gap of a motor hood 24 defined by hood 21 and connecting area 22 between the windshield 9 and the car body. The articulated member 12 as well as a part of the wiper rod 14 are indicated in full lines, whereas a conventional wiper arm with an articulated member 12' and a wiper rod 14' is indicated in broken lines. The fastening member 10 partly displayed is connected with the articulated member 12 via a swivelling peg 11 so that, if the wiper arm 1 is outside the gap 24 of the hood, it can be pivoted in the direction of the double arrow. Due to the fact that both the articulated member 12 and the wiper rod 14 are arc-shaped and the longitudinal median line 23 thereof runs approximately parallelly to the connecting area 22 and thus also to the hood 21, it is possible to minimize the gap 24 of the hood.

To sum it up, it can be said that the proposed wiper arm is characterized especially by the arc-shaped form of the articulated member and of the wiper rod. Thus this particularly small overall heights are achieved. An articulated member known so far would require a larger gap of the hood. Having a contour in which the upper edge of the articulated member is adapted to the scuttle as much as possible is of an advantage. This also applies to the rod and to the fastening member. Also, in its top view, the wiper arm should be adapted to the scuttle. The above mentioned shapes have the effect that the wiper arms are like parts of the car body and not like foreign objects.

I claim:

1. In a windshield wiper system including a wiper arm on a motor vehicle, said system having a windshield with a curved windshield surface and a curved lower edge, said curved lower edge defining a curved line of contact with a connecting area of said vehicle, said vehicle also having a hood with a curved rear edge, a gap existing between the curved rear edge of the hood and the curved windshield surface adjacent the lower edge, the improvement comprising:

a multi-sided elongated articulated member having a first end pivotally mounted to said vehicle and a second end;

a multi-sided elongated wiper rod extending longitudinally away from said second end; and a wiper blade secured to said wiper rod, wherein said member, said rod, and said wiper blade rest within gap when at a common start and repose position, first opposing longitudinal sides of said member and said rod having a curvature along their length substantially parallel to the windshield surface adjacent the lower edge and the rear edge of the hood, resulting in a minimized overall height of said wiper arm and providing for a minimized gap between the rear edge of the hood arid the windshield surface adjacent the lower edge, second opposing longitudinal sides perpendicular to said first opposing sides of said member arid a portion of said rod secured to said member having a curvature along their length substantially parallel to the line of contact.

2. In a windshield wiper system as recited in claim 1, wherein said wiper blade is in continuous physical contact with the windshield.

3. In a windshield wiper system as recited in claim 1, wherein a multi-sided spoiler is secured to and extends laterally away from said rod, first opposing sides of said spoiler adapted to the outer contour of the windshield adjacent said lower edge, and a second perpendicular side closest said lower edge adapted to the shape of the line of contact.

* * * * *

UNITED STATES PATENT AND TRADEMARK OFFICE
CERTIFICATE OF CORRECTION

PATENT NO. : 5,495,637
DATED : March 5, 1996
INVENTOR(S) : Egner-Walter

It is certified that error appears in the above-indentified patent and that said Letters Patent is hereby corrected as shown below:

Column 3, line 8, delete "arid" and substitute "and"

Column 3, line 10, delete "arid" and substitute "and"

Signed and Sealed this

Ninth Day of July, 1996

Attest:

BRUCE LEHMAN

*Attesting Officer*     *Commissioner of Patents and Trademarks*